United States Patent
Braganca et al.

(10) Patent No.: US 6,723,805 B2
(45) Date of Patent: Apr. 20, 2004

(54) PROCESS FOR THE CONTROLLED PRODUCTION OF POLYETHYLENE AND ITS COPOLYMERS

(75) Inventors: Antonio Luiz Duarte Braganca, Porto Alegre (BR); Esdras Piraguacy Demoro, Porto Alegre (BR); Artur Toledo Martins De Oliveira, Porto Alegre (BR)

(73) Assignee: Braskem S.A., Camacari (BR)

( * ) Notice: Subject to any disclaimer, the term of this patent is extended or adjusted under 35 U.S.C. 154(b) by 0 days.

(21) Appl. No.: 10/148,999

(22) PCT Filed: Dec. 29, 2000

(86) PCT No.: PCT/BR00/00155

§ 371 (c)(1),
(2), (4) Date: Aug. 2, 2002

(87) PCT Pub. No.: WO01/49751

PCT Pub. Date: Jul. 12, 2001

(65) Prior Publication Data

US 2003/0105247 A1 Jun. 5, 2003

(30) Foreign Application Priority Data

Dec. 30, 1999 (BR) .............................................. 9906022

(51) Int. Cl.$^7$ .................................................. C08F 2/34
(52) U.S. Cl. ........................... 526/61; 526/59; 526/135; 526/235; 526/901; 526/905
(58) Field of Search .............................. 526/59, 60, 61, 526/135, 235, 901, 905

(56) References Cited

U.S. PATENT DOCUMENTS

| 4,469,853 A | | 9/1984 | Mori |
| 5,111,531 A | * | 5/1992 | Grayson et al. ............... 395/23 |
| 5,830,954 A | * | 11/1998 | Hayashi et al. ............... 526/60 |
| 5,844,054 A | | 12/1998 | Samples et al. |

FOREIGN PATENT DOCUMENTS

| WO | 93/24533 A1 | 12/1993 |
| WO | 98/54231 A1 | 12/1998 |
| WO | 99/53387 A1 | 10/1999 |

* cited by examiner

*Primary Examiner*—Fred Teskin
(74) *Attorney, Agent, or Firm*—Birch, Stewart, Kolasch & Birch, LLP (57) ABSTRACT

A process for producing high density polyethylene (HDPE) or linear low density polyethylene (LLDPE) in gas phase reactors, isolated or combined, using chromium or Ziegler-Natta catalysts, provided with on-line control of certain process variables as well as physical properties of the produced resin is described. Such process comprises the use of models for the inference of the physical properties and of the process variables that are not continuously measured as well as models which are relevant for the control of said properties and of the operating conditions of the process. The control of the process variables provides further the maximization of the production rate and of the catalyst productivity in the polymerization reaction.

56 Claims, 6 Drawing Sheets

FIGURE 1

|  | | CONTROLLED VARIABLES | | | CONSTRAINTS | |
|---|---|---|---|---|---|---|
|  | | CV1 | CV2 | CV3 | CCV1 | CCV2 |
| MANIPULATED VARIABLES | MV1 | X |  | X | X |  |
|  | MV2 |  | X | X |  | X |
|  | MV3 | X | X |  | X |  |
|  | MV4 | X |  | X |  |  |
| DISTURBANCES | DV1 |  | X |  | X |  |
|  | DV2 | X |  |  |  | X |
|  | DV3 |  |  |  | X |  |

| | controlled variables / constraints | | | | | | | | | |
|---|---|---|---|---|---|---|---|---|---|---|
| manipulated variables/disturbances | | PRODUCTION | MFR$_1$ | MFRR | DENSITY | PRODUCTIVITY | TV | PP | [H$_2$]/[C$_2$=] | [C$_x$=]/[C$_2$=] | SUP VEL |
| | CAT | X | | | | X | X | | | | |
| | C$_x$=/C$_2$= | X | | | | X | X | X | X | X | X |
| | TEMP | X | X | X | X | X | X | X | | X | X |
| | RO | | X | X | X | | | X | X | X | X |
| | H$_2$/C$_2$= | X | | | | X | X | X | X | X | X |
| | RECYCLE | | | | | | | | | | X |
| | PRESSURE | X | | | | X | X | X | | | |
| | BO | X | | | | X | X | X | X | X | X |
| | IN | X | | | | X | X | X | X | X | X |
| | LEVEL | X | | | | X | X | | | | |
| | [H$_2$]/[C$_2$=] | | X | X | | | | | | | |
| | [C$_x$=]/[C$_2$=] | | X | X | X | | | | | | |

FIGURE 6

| | controlled variables / constraints | | | | | | | | | | |
|---|---|---|---|---|---|---|---|---|---|---|---|
| manipulated variables/disturbances | | PRODUCTION | MFR2 | DENSITY | TV | SUP VEL | PP | BP | DELTA T | [H2]/[C2=] | [Cx=]/[C2=] | PRODUCTIVITY |
| | RECYCLE | | | | | X | | | | | | |
| | PRESSURE | X | | | X | | X | | X | | | |
| | TEMP | X | X | X | X | | X | | X | X | | X |
| | LEVEL | X | | | X | | X | | X | X | X | |
| | PP | | | | | | | | | X | X | X |
| | CAT | X | | | X | | X | | X | X | X | |
| | IN | X | | | X | | X | | X | X | X | |
| | Cx=/C2= | X | | | X | | X | X | X | X | X | |
| | H2/C2= | X | | | X | | X | | X | X | X | |
| | BO | X | | | X | | X | | X | X | X | |
| | [Cx=]/[C2=] | | X | X | | | | | | | | X |
| | [H2]/[C2=] | | X | X | | | | | | | | |
| | GAS DENS | | | | | X | | | | | | |

PROCESS FOR THE CONTROLLED PRODUCTION OF POLYETHYLENE AND ITS COPOLYMERS

This application is the national phase under 35 U.S.C. §371 of PCT International Application No. PCT/BR00/00155 which has an International filing date of Dec. 29, 2000, which designated the United States of America.

FIELD OF THE INVENTION

The present invention relates to a process for the controlled production of high density polyethylene (HDPE) or of linear low density polyethylene (LLDPE) in one or more gas phase reactors, in the presence of either chromium or Ziegler-Natta catalysts, said process possessing an on-line control of certain process variables as well as the control of certain physical properties of the final resin product. More specifically, such process comprises: i) the use of models for inferring the physical properties as well as the process variables which are not measured continuously and ii) models which are relevant for the control of said properties and operating conditions of the process under study. The control of the process variables provides further the maximization of the production rate as well as of the catalyst yield in the polymerization reaction.

BACKGROUND INFORMATION

The control of the process variables in petrochemical plants is normally manually effected by operators who periodically sample the product to be tested and act to maintain or to correct the operating conditions as to obtain a product having the desired characteristics. This involves delays related to required corrections, since the sampling and laboratory tests normally lag the on-line process, besides possible human errors. Further, the dynamics of petrochemical processes is generally slow. Thus, long periods of time may be required so that the effect of the adjustments performed on the process input variables become effective. Therefore, the slow dynamics is a feature which renders difficult the control of the industrial unit since the worker may not know if there has been a sufficient time for the effects of the performed adjustments to be apparent or either if more time is required so that said effects are completely perceived.

On the other hand, techniques for the empirical as well as rigorous modeling are known, which may be used for obtaining process models. Such mathematical models are able to infer the value of certain process variables that are periodically measured from other process variables that are continuously measured. Besides, the mathematical models may also be used to predict the future behavior of process variables caused by modifications in the operating conditions of an industrial plant.

The techniques of rigorous modeling are based on the physical principles, which describe the basic interactions between the process variables. As compared to the empirical techniques, the rigorous models are more difficult to construct and require a deep knowledge of the process. Besides, the complexity of the equations, which make up the rigorous model, may render it, at least in some cases, unsuitable for on-line implementation, this difficulty arising from the long time to resolve such equations, even making use of computers.

On the contrary, the techniques of empirical modeling do not require such a deep knowledge of the process being modeled and originate simpler mathematical models which may be quickly executed, being therefore suitable for being executed in real time. A disadvantage of the empirical models is that they cannot be used under operating conditions different from those used in their identification. Models obtained from linear and non-linear regressions as well as neural networks are among the relevant empirical modeling techniques described in the literature.

Neural networks are networks of either neurons or elements which are interconnected in a unique way. Typically, the networks are made up of input neurons which receive signals or information from outside the network, output neurons which transmit signals or information to outside the network and at least one intermediate layer of neurons which receive and transmit the information to other neurons.

Besides the fact of a model being rigorous or empirical, it may also be characterized as static or dynamic. A model is said static when it yields as a result the steady state values of the process variables in view of the values assumed by the input variables of the system. On the other hand, the dynamic model presents, besides the information on the steady state of the system, information on the way by which the output variables move between two steady states.

A large number of references describe processes provided with control, for the production of polyolefins.

U.S. Pat. No. 3,636,326 teaches how to adjust the production rate of a polymerization reactor based on the catalyst yield calculated in real time. Thus, possible modifications in the catalyst yield may be automatically compensated by means of a feedback control loop. This kind of control may be practiced when the variables which affect the catalyst yield are not known or not measured. In this case the best to do is to automatically adjust the catalyst rate as soon as a variation in the catalyst yield is perceived. However, by using process models it is possible to preview that catalyst yield will undergo modifications due to certain changes in the operating conditions. Thus, it is possible to previously adjust the catalyst rate so that the change in catalyst yield does not significantly affect the production rate of the reactor.

This and other advantages to be mentioned hereinbelow are features of the controlled process to be described and claimed in the present application.

U.S. Pat. No. 3,998,995 teaches a process in which the production rate and monomer concentration are controlled in a polymerization reactor able to restrict the concentration of the main monomer and the solids concentration at maximum values. In said process, the production rate is controlled by the flow rate of olefinic monomer while the concentration of monomer in the reaction zone is controlled through the adjustment of a diluent feed fed to the process. If the maximum limiting value for the monomer concentration is reached, monomer flow rate is then adjusted to reduce said concentration and no longer to control production. If the maximum limiting value for the solids concentration is reached, the flow rate of diluent is adjusted to reduce said concentration and no longer to control the monomer concentration. Whenever the constraints are violated the goal of controlling production rate and monomer concentration is abandoned in favor of the continuity of operation. The control system which is unable to deal with constraints will not be able to guarantee the safety and the operational continuity required for an industrial unit to accomplish its goals. In spite of the fact that the said U.S. Patent presents a control procedure able to deal with the plant constraints, the system works only from the moment when the constraint has been effectively violated. A controller which could predict the future behavior of the process variables would be able to promote the required adjustments so that the constraint would not be violated or would be just slightly violated. A process whose constraints are so controlled, would allow that the main control objectives would not be abandoned.

A method for the control of the intrinsic viscosity of a polymer which is being produced has been taught in U.S. Pat. No. 3,878,379. The technology unveiled in said U.S. patent, besides being specifically directed to the production of polyethylene terephthalate, relates to one single variable and does not contemplate the control of different polymer properties.

U.S. Pat. No. 4,469,853 provides a process for the production of polyolefins in the liquid phase having a few well defined properties. Such process describes the use of chromatography for the measurement of the concentrations of olefin monomers and hydrogen in the gaseous phase, which is formed on the top of the reactor. The control of the flow rates of ethylene and comonomers is adjusted so as to keep constant the ratio between the concentrations of said reagents so as to lead to a polyolefin having predetermined density. Further, said U.S. patent achieves the control of the ratios between the concentrations of hydrogen and main monomer by adjusting the flow rate of hydrogen feed to the reactor and thus leading to a polyolefin having a predetermined melt flow rate. Optionally, the partial pressure of ethylene in the reactor could be controlled through the adjustment of the flow rate of the feed of catalyst while the pressure could be controlled through the adjustment of the reactor flow rate of purge. The problem addressed by the cited application is the control of reagent concentrations in the reactor, which is a gas/liquid phase reactor. The reference proposes that the control of the concentration in the reactor may be improved by monitoring reagent concentrations in the gas phase instead of the liquid phase such improved concentration control leading to a polymer with more stable properties. The control strategy cited in the referenced invention is that of simply using hydrogen to control a flow property and comonomer to control polymer density. The problem with such a strategy is that these control loops are coupled since comonomer also affects the flow properties and hydrogen also affects density. The invention as claimed herein teaches how to solve the loop interaction problem by using a multivariable control strategy.

U.S. Pat. No. 5,098,967 teaches how to control the molecular weight of polypropylene and its copolymers produced in the liquid phase by measuring the heat released during the polymerization. The calculation of the amount of polymerized monomer is effected on the basis of said measurement. This leads to the possibility to anticipate a controlled flow rate of hydrogen feed to the reactor so as to keep a predetermined ratio between reacted monomer and hydrogen feed so that it is possible to obtain a polymer of desired molecular weight.

U.S. Pat. No. 5,504,166 teaches how to control the melt flow rate and the comonomer content of a polymer produced in a horizontal stirred-bed reactor. Such properties are related to a set of operation variables and to parameters which are intrinsic to the process.

U.S. Pat. No. 5,282,261 teaches the use of values which are predicted by a neural, network in real time to be used instead of a measuring instrument or a lab test as an input for a controller, so as to implement an inference and control system in a continuous process while using neural networks. However, said U.S. patent does not teach how to apply the described system to polymerization process nor teaches any control structure which might be particularly applied to the process for producing polyethylene and its copolymers.

U.S. Pat. No. 5,844,054 discloses a process for the polymerization of olefins in gas phase fluidized bed reactors comprising control of a set of controlled variables comprised of production rate, melt flow rate and density through predictive computer models and coordinated adjustments to a set of manipulated variables comprised of catalyst feed rate, oxygen to alpha-olefin molar ratio and comonomer concentration. The invention as claimed herein provides improved functionality over the cited reference application as it takes important influences such as hydrogen concentration, inert concentration, fluidized bed level, fluidized bed temperature, pressure, recycle gas flow rate, bleed stream flow rate into account for predicting the behavior of process variables and product properties. Further, the present invention also discloses how to achieve improved process stability as this broader set of input variables is simultaneously monitored and coordinated to provide not only control of production rate and melt flow ratio control but also of melt flow rate ratio, catalyst productivity, superficial velocity, ethylene partial pressure. hydrogen concentration and comonomer concentration.

Thus, none of the patents no the publications of the state-of-the-art technique, either isolated or combined to each other, teach a process for producing HDPE or LLDPE in a single or combined gas phase reactors, using chromium or Ziegler-Natta catalysts in which process may be on-line and simultaneously controlled the production rate, the catalyst yield, the superficial velocity and the gas composition within the reactor, among other process variables, together with various physical properties of the product, such as melt flow rate and density, such process being described and claimed in the present application.

The general object of WO 93/24533 is to provide an improved method for the advanced control for the continuous gas-phase polymerization of an alpha-olefin in a substantially horizontal, quench-cooled, stirred bed reactor in which solid liquid and gas phases are present. The invention as claimed by the Applicant is directed towards a process which differs from the cited reference in a key aspect, this difference arising from the fact that the type of reactors used in each process are different. The process variables relevant for the control of a quench-cooled, stirred bed reactor are not the same as the ones which are relevant for the control of a reactor containing only gas and solid phases and, thus, the reference neither discloses nor suggests which manipulated variables and disturbances should be considered for the advanced control of the process of the present invention.

WO 98/54231 relates to improved control of the temperature of a fluidized bed by the simultaneous and coordinated manipulation of the water flow rate and the cycle gas flow rate. Thus, the reference discloses a process in which temperature is the controlled variable and the water flow rate and the cycle gas flow rate are the manipulated variables. Differently, the process claimed in the present invention relates to improved control of a set of controlled variables comprising production rate, MFR1, MFRR, density, ethylene partial pressure and concentration of comonomers among other variables. The invention as claimed hereinafter makes no reference to any method whatsoever for improving the temperature control of the fluidized bed.

SUMMARY OF THE INVENTION

The present invention relates to a process for the controlled production of HDPE or LLDPE in a single or combined gas phase reactors, under polymerization conditions, in the presence of hydrogen, oxygen, inert diluents and using chromium or Ziegler-Natta catalysts, the process having an on-line control of certain process variables, as well as of some physical properties of the produced resin.

Such control is based on dynamic mathematical models which describe the effects of the manipulated variables and of the disturbances on the controlled variables as well as the variables whose values should be restricted to certain operation ranges. The use of such models renders possible to infer the properties of polyethylene in real time from the on-line measurement of other process variables. Besides providing an estimate of the quality of the polymer, models are used by an optimization algorithm which determines the best set of control actions to be taken so that the controlled variables can approach the set point for each of the variables without violating the constraints imposed to assure continuous and safe operation of the unit.

Thus, the present invention provides a process for the controlled production of polyethylene and its copolymers, the control being based on dynamic mathematical models used for the simultaneous and on-line line control of the melt flow rate 1 ($MFR_1$), the ratio of melt flow rates (MFRR) and the density of the resin produced from the chromium catalyst as well as the melt flow rate 2 ($MFR_2$) and the density of the resin produced from Ziegler-Natta catalysts.

The present invention still provides a process endowed with an on-line control of the production rate, the catalyst productivity, the composition of the gas within the reactor, the superficial velocity of the fluidized bed system, the bubble temperature of the reactor recycle stream and the difference between the inlet and exit temperature of the water in the cooling system of the reactor.

The present invention provides further the maximization of the production rate of polyethylene and the catalyst yield for the described process.

DETAILED DESCRIPTION OF THE PREFERRED EMBODIMENTS

In the present specification, the expression "on-line" means that the physical properties which are to be inferred are obtained in real time.

The expression "quality of the polymer" refers to the physical properties of the polymer such as melt flow rates $MFR_1$ and $MFR_2$, MFRR, density etc., which affect the properties of the resin.

$MFR_1$ and $MFR_2$ are the melt flow rates of the resin, measured according the ASTM Method D-1238. Measurements are made at 190° C. using 21.6 g and 2.16 g weights, respectively.

MFRR (melt flow rate ratio) is the ratio of melt flow rates of the resin, calculated as $MFRR=MFR_1/MFR_2$ The density of the resin is measured according to ASTM Method D-1505.

The expression "catalyst productivity" is a synonym for catalyst yield and represents the mass of polymer produced per mass of catalyst used.

The expression SISO (Single Input Single Output) control strategy means that one single manipulated variable is adjusted to control a certain controlled variable.

The expression MIMO (Multiple Input Multiple Output) control strategy means that multiple manipulated variables are adjusted at the same time to control a set of controlled variables.

The term "feedback control" means the mechanism of feeding to a controller the difference between the desired value for a certain variable (set point) and the measured value of said variable.

The expression "gas phase reactor" means that in the reactor there are at least one gaseous phase containing monomer and at least one solid phase containing catalyst. The gas phase reactors useful for the practice of the invention are the vertical fluidized bed reactors or horizontal fluidized bed known in the art. The same way, other types, such as reactors provided with mechanical agitation, may be employed. A general idea of the kind of available technologies may be found in the chapter "Gas-phase Polymerization", Encyclopedia of Polymer Science and Engineering", second edition, vol. 7, p. 480–488, John Wiley & Sons, Ed.

A definition of Ziegler-Natta catalysts may be found in the chapter "Definitions, stereochemistry, experimental methods and commercial polymers", from the book by John Boor, Jr., "Ziegler-Natta Catalysts and Polymerizations", p. 32–35, Academic Press.

The chromium catalyst may be one of the well-known Phillips catalysts or either belong to another classification. A definition of the Phillips catalysts may be found in the chapter "Metal alkyl-free Catalysts" from the book by John Boor Jr, "Ziegler-Natta Catalysts and Polymerizations", p.279–324, Academic Press.

The present process is directed to the production of HDPE or LLDPE either as polyethylene homopolymer or copolymer. In case of copolymers, the comonomers may be chosen, besides ethylene, among the group of reactive olefins such as: propene; 1-butene; 2-methyl propene; 1-pentene: 1-hexene; 1-heptene; 1-octene; 1-decene; 3-methyl 1-butene; 4-methyl 1-pentene; cyclopentene, the comonomers being copolymerized isolated or in admixture.

The preferred catalyst for the production of HDPE is the chromium catalyst while the preferred catalyst for the production of LLDPE is the Ziegler-Natta catalyst. However, other catalysts may be employed as well.

Figure 1:
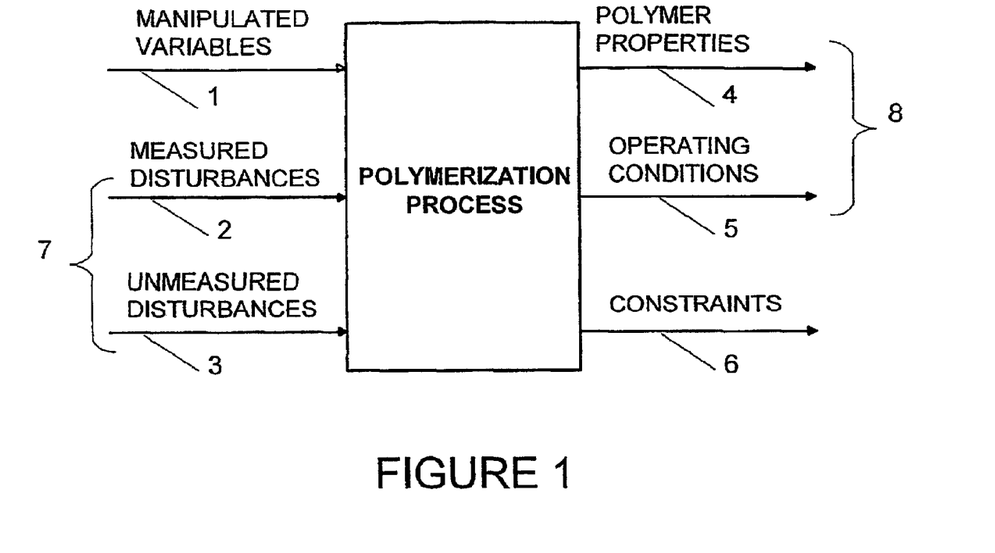
FIG. 1 is a representation of the categories in which are classed the process variables which make up a chemical process.

According to FIG. 1, in order to set a control strategy for polymerization reactors, it is convenient that the process variables are classified into: controlled variables (8), manipulated variables (1), constrained controlled variables or simply constraints (6) and disturbance variables or simply disturbances (7).

Controlled variables (CV) are those variables the value of which should be kept the closest possible to a desired value or set point. In a polymerization plant the controlled variables may be divided into two categories: polymer physical properties (4) and process variables which define operating conditions of the plant (5).

The physical properties (4) of the polymer such as melt flow rates $MFR_1$ and $MFR_2$, density, MFRR, etc. establish the quality of the polymer. The process variables which define operating conditions of the plant (5) or simply operating conditions, involve temperatures, pressures, flow rates, etc.

Constrained Controlled Variables CCVs are variables that, in spite of being controlled, do not need to have their value kept close to a set point. However, they should be controlled so as not to exceed certain limits.

Manipulated variables MVs are those which should be adjusted so that the controlled variables may be kept close to a set point or within certain limits. In order that a process variable is used as manipulated variable in a control strategy, the latter should somehow affect at least one controlled variable or a constrained variable. Examples of MVs are flow rates of monomer, catalyst and cooling water.

In general, operators who follow the operation of a chemical process know, at least qualitatively, the way a certain MV affects a certain CV. It is usual to have some limit in regard to the variation rate of MV since for certain variables it may not be safe to promote large adjustments in a short period of time.

Another reason for the existence of a limit or constraint in the variation rate is the inertness of the working instruments (valves, engines, etc.) which regulate the values of the MVs. Even if a valve is deemed to stay utterly open, there is a delay until the valve actuator moves from its present situation until the position where the opening of the valve is maximum. Thus, for a process control to be efficient and safe the variation rate constraint for the MVs should be taken into consideration.

Disturbance Variables DVs, are process variables which also affect the controlled variables but on which the plant operator cannot exert any action. Examples of disturbances are: impurities in the monomer stream which feeds the reactor and the catalyst quality. Disturbances generally arise from known causes but it is not easy to eliminate them since they are originated by parameters which are extraneous to the process. Some disturbances may be measured (measured disturbances 2), others, i.e., unmeasured disturbances 3 may not. A control system may take into consideration the measured disturbances (2) by promoting an adjustment in the manipulated variables before the effect of the disturbances are apparent in the product quality.

The classification of a process variable into one of the above-mentioned categories is not always trivial. For example, the concentration of comonomer in the reactor may be an MV for the adjustment of the polymer density and at the same time be a CV in a concentration control loop which uses the comonomer flow rate as MV. In this case the MV for the control of the density is the desired value for the comonomer concentration. This kind of strategy is called cascade control. Besides, under the point of view of control, if a process input is not being used as MV then it may be considered as a DV. As indicated above, the classification of the variable as CV, CCV, MV and DV depends on the control loop being considered. Further, there is the fact that the same variable may be controlled and at the same time submitted to constraints. In the present specification the expression CV will be used for the variables the value of which should be kept close to a desired value (that is, the set point) even if said variable should be submitted to constraints.

Figure 2:
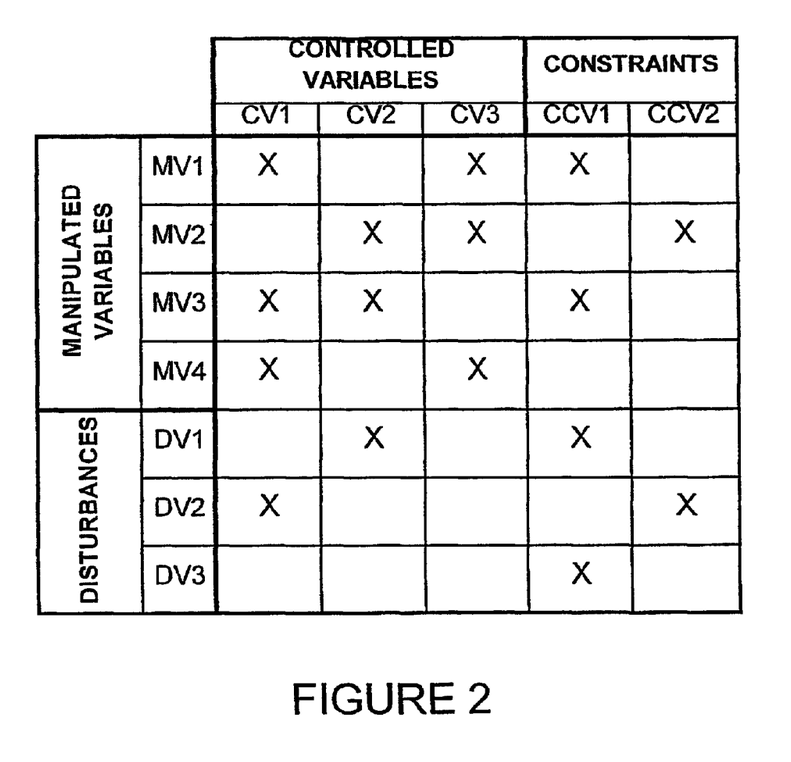
FIG. 2 is a representation of a control matrix.

The set of CVs, CCVs, MVs and DVs will make up the control matrix of the process which is one of the ways used to represent multivariable control systems. FIG. 2 shows an example of control matrix. In this matrix the columns represent the CVs and CCVs and the lines represent the MVs and DVs. The assigned positions within the control matrix indicate that a certain MV or DV is used in the modeling of a certain CV or CCV. It is the right choice of said variables which determines the scope of the control system as well as the potential benefits from its use in a controlled process.

Once the control matrix is defined, mathematical models of the process should be constructed for each CV and CCV, so that the model inputs should be the MVs and the DVs, while the outputs should be the CVs and the CCVs. The function of the models used for process control is precisely the storage of the cause-effect relationships between the CVs/CCVs and the MVs/DVs as mathematical equations.

The physical properties of a polymer and the economical factors involved in the process, such as production rate and the catalyst yield, are a function of the raw materials used to make it, as well as of the operating conditions used in the polymerization reaction. Thus, once the raw materials to be used in the polymerization are determined, it is of utmost importance that the process inputs are manipulated so that the physical properties are controlled while at the same time high production rates and high catalyst yield are sought.

Most of the physical properties which define the product quality are not measured on-line. In many cases there are no analyzers which could be directly connected to the process and there are cases where in spite of the fact that the technology for the measurement of such variables is available, the cost of the sensors may render its use impractical. This makes that tests are effected in the lab, with a sampling interval of a few hours. This way, during the period between one test and the following one, there is no indication whatsoever of the quality of the product, this causing a gap between the possible alterations in the variables and the implementation of whatever corrections which might be deemed necessary. In order to overcome the problem of scarcity of measurements of the polymer quality, process modeling techniques may be used, those allowing to continuously infer the properties which are not continuously available.

A further relevant aspect related to the process control is that, in general, economical considerations cause that the process should be operated under operating conditions close to the plant limits. Thus, the flow rate of catalyst could be manipulated to control the reactor production rate; however, whenever the polymerization heat overcomes the limit of the heat exchange capacity of the reactor, the objective of a further increase in production should be restricted in favor of the thermal stability.

This example illustrates the importance of considering the CCVs in a multivariable control strategy since these are the variables which will determine the limits within which it is possible to safely operate the process. Besides, it is near these limits that the best result is obtained in economical terms, which may be visualized through the increased production rate as well as higher catalyst yield.

Polymerization processes show a high interaction degree among the various process variables, which renders difficult the task to pursue several control goals at the same time. One interaction example is the relationship existing among the control of density, $MFR_1$ and the production rate in the process for producing polyethylene. Adjustments in the comonomer flow rate aiming at controlling the polymer density cause modifications in the production rate and the melt flow rate. In order to keep the specified melt flow rate, other MVs should be adjusted, which in turn may intervene in the control of density and production rate. Thus, were the adjustments made independently, there would be a great possibility that a reduction or increase in the overall effect of the control actions on certain CVs could occur. In order to avoid such situation, the process adjustments should be performed considering the effect of all input variables (MVs and DVs) on the output variables (CVs and CCVs), as established in the control matrix so as to correct the value of the desired variable, without altering the value of the remaining variables.

Although it is possible to control the plant using static process models, this is not the most efficient alternative, since the adjustments should be performed slowly in view of the fact that the model does not contain information on the rate at which the process responds to said adjustments. On the contrary, a dynamic model-based system is able to perceive if the CVs are deviating from the desired operation condition even during transition periods. This is a further advantage of the controlled process of the present invention since in an industrial plant for producing polyethylene, transitions are frequent in order to make resins of varied specifications. The making of such transitions using the controlled process of the invention not only lowers the duration of the transition from one operating condition to the following one, but also minimizes the yield of off-specification resin.

Therefore, in order to obtain significant benefits, the control of such processes should be multivariable (MIMO), that is, it should comprise various CVs and various MVs. Besides, the process control should take into consideration the physical limits of the plant under study (CCVs and variation rates), possible DVs which may be measured as well as the process dynamics.

Once the mathematical models have been adjusted to represent the relationships between the process variables, this model may be used for inference as well as for control.

In case it is used for inference, the model is designed to provide an estimation of the variables and physical properties which are not continuously available such as those which are measured through lab tests or through instruments in which data collection and measurement processes involve longer periods of time.

And in case it is used for control, the model is designed to predict the future behavior of the CVs and CCVs in case certain adjustments are made in the MVs and in case variations in the DVs might occur. Thus the controller may determine the best set of actions to be taken so that the controlled variables attain the desired values without violating the constraints.

In the process which is the object of the present specification the modeling technique comprises preferably the use of neural networks as process models. Optionally, other empirical and/or rigorous modeling techniques may be used alone, combined among themselves or either combined to neural networks models for creating process models.

Figure 3:
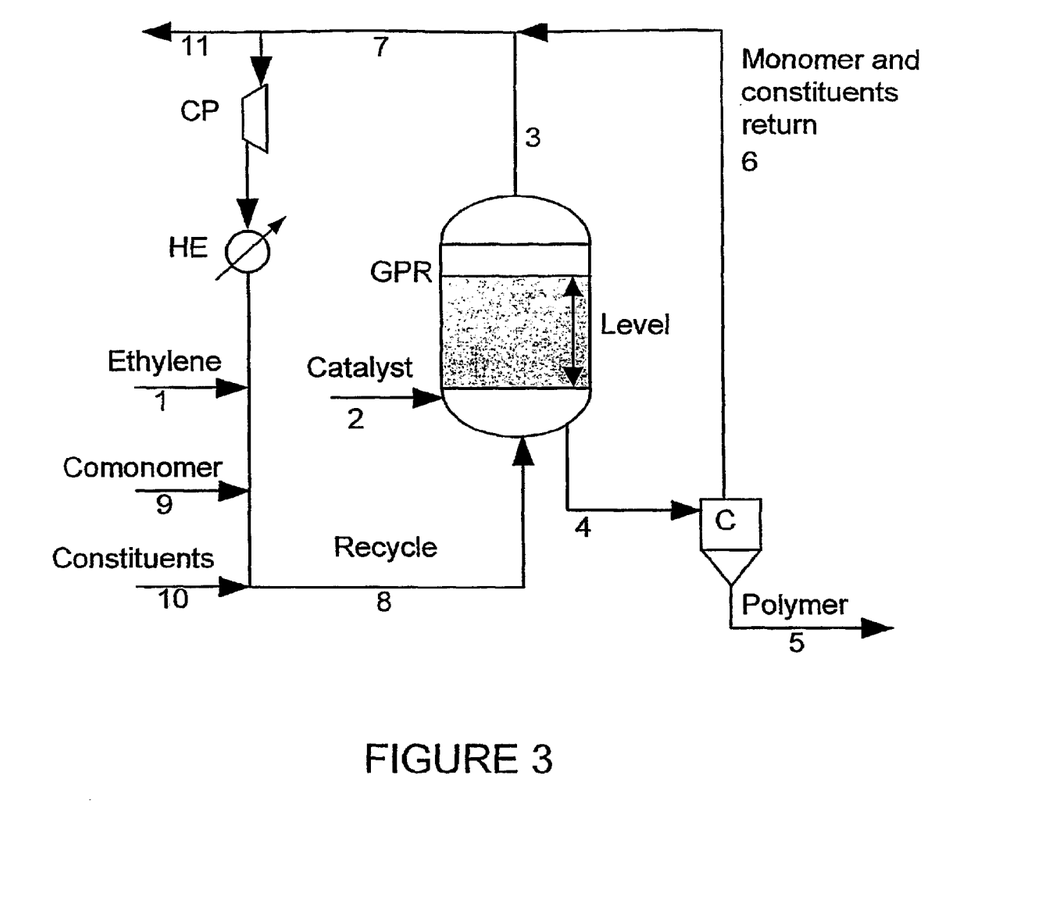
FIG. 3 is a simplified representation of the plant for producing polyethylene according to the present invention.

FIG. 3 presents the main streams and unit operations which make up a polyethylene plant in gas phase reactors operating in a fluidized bed. For the sake of illustration a vertical fluidized bed reactor is represented. The polyethylene production rate is controlled mainly through the injection of catalyst (stream 2). Monomer (stream 1) and, in case of the production of copolymer, comonomer(s) (stream 9) is fed to the system, together with other constituents (stream 10) through the recycle stream of the reaction system (stream 8). The additional constituents comprise: hydrogen, oxygen, carbon dioxide besides inert diluents. Examples of inert diluents are: nitrogen, argon and up to 6 Carbon atoms alkanes, isolated or admixed in any amount. The gas composition within the reactor may be controlled by adjusting the flow rates of the various streams which are fed to the system. The flow rate of stream 8 should be such that the superficial velocity of the gas within the reactor is strong enough to support the bed without collapse and without entrainment of particles through the top of the reactor.

The non-reacted gas, excess monomer(s) and inert constituents when traversing the reactor keep the particles forming the bed in a fluidized state and remove the heat generated by the reaction. Said gas exits at the top of the reactor (stream 3) and adds to the monomer and constituents recovery stream (stream 6) so as to form stream 7. Such stream is compressed in compressor CP and cooled in heat exchanger HE. The flow rate of cooling water in such exchanger is manipulated so as to keep the reactor temperature stable. As polymerization proceeds, the product is continuously discharged from the reactor (stream 4). The rate of product withdrawal may be manipulated so as to keep the level of the fluidized bed stable. With the polymer, a certain amount of gas leaves the reactor with stream 4. In view of the fact that such diluents do not react, and in order to avoid the accumulation of those inert constituents in the system, there is a purge stream (stream 11) which may be used, together with the feed flow rates, to control the amount of inert constituents present in the system. Cyclone C separates the gas present in stream 4 and sends it back to the reactor (stream 6) so that the monomer may be re-used. The polymer is directed (stream 5) to the degassing, deactivation and extrusion steps, which are not represented. Sometimes a portion of stream 8 enters the reactor partially in the liquid state. This way a portion of the reaction heat is removed as latent heat through the vaporization of the liquid present in the stream, leading to higher production rates.

When the plant is operated in the above-described manner, it is relevant to control the temperature of the bubble point of said stream, since if this value is much higher than the reactor temperature, because of an excessively high concentration of heavier constituents, there may be not enough heat to completely vaporize the liquid which enters the reactor, this causing operating drawbacks.

FIG. 3 illustrates one possible configuration of the present process, which may be used either for producing HDPE or LLDPE. However, the present invention is not limited to the said embodiment, and may be applied to other kinds of gas phase reactors as well as to other configurations containing a higher number of reactors.

Among the main objectives of a plant for producing polyethylene and its copolymers are the preparation of polymers having physical properties within certain specifications and the optimization of economical goals such as a specific catalyst consumption and the production rate of the plant. That is, it is desired to minimize the consumption of catalyst per ton of produced polymer, this leading to increased catalyst productivity and to a reduction in the amount of catalyst residue in the product, as well as to the maximization of the amount of polymer produced per hour.

Conventionally, in such an industrial plant, the reactors are operated according to predetermined recipes and the lab tests show if there is the need to adjust the operating conditions so that the product quality is kept within the specified limits. The lab tests involve measurements of $MFR_1$, $MFR_2$ and density. From the values of $MFR_1$ and $MFR_2$ it is possible to calculate MFRR, which serves as an indication of the molecular weight distribution of the resin.

According to the process of the invention, which controls the physical properties listed above, there is comprised a plant for producing polyethylene in the gas phase, a Digital Control System (DCS), a process computer connected to the DCS, an information system for the storage of historical process data and a system into which lab test values are fed.

Figure 4:
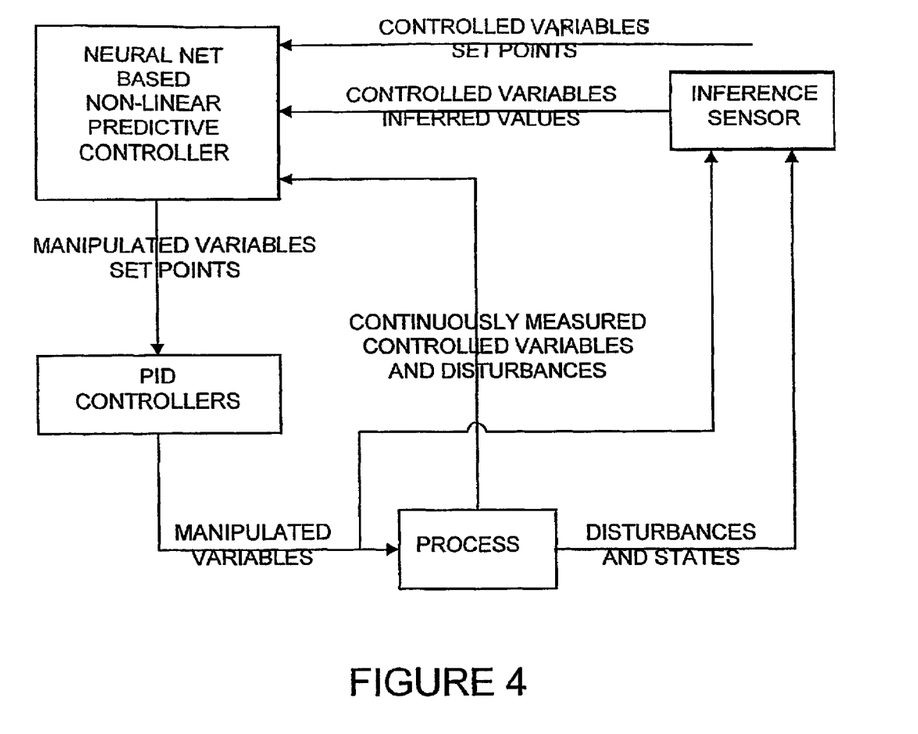
FIG. 4 is a schematic representation of the implementation of the process control described and claimed in the present invention.

FIG. 4 shows, according to the inventive process, how the control is implemented. The controlled variables may be continuously available as in the case of the production rate or may be periodically measured as in the case of lab tests or chromatograph measurements. In case the CVs are periodically measured and/or present significant delays relative to the measurement period, the values of said variables are inferred in real time and those are the values which are controlled in the inventive process.

Figure 5:
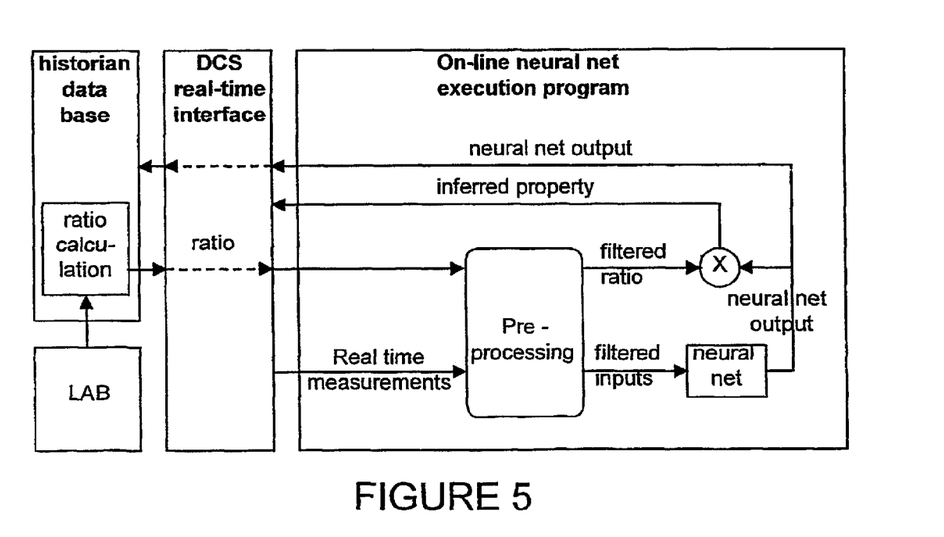
FIG. 5 is a schematic representation of the implementation of the inference of the process variables.

Whenever it is required to infer a property or a process variable one should use the procedure illustrated in FIG. 5. The inputs of the mathematical models are measured in real time with the aid of the metering instruments connected to the DCS. The DCS conveys the obtained values to the software installed in the process computer in charge of the calculations of the mathematical model. The software that makes the calculations of the mathematical model also makes any pre-processing in the input signals as required. The output of the mathematical model is sent back to the DCS and also to the software which keeps the process historical data base so that those data can be used later on.

The inference of the desired property is obtained by multiplying the output of the mathematical model by a factor, called "ratio" in the present specification, which is calculated based on lab tests. The "ratio" is designed to correct possible mistakes in the estimation effected by the mathematical model when compared to the result of the lab test. This factor is calculated as the ratio between the value as supplied by the lab test and the value as estimated by the mathematical model at the moment when the tested sample was effectively collected. In order to avoid sudden variations in the inferred value, which is not good to the controller who receives such signals, the value should be filtered before the multiplication.

The "ratio" is calculated with the aid of the same program in charge of the process historical data base since, as mentioned hereinbefore, said calculation considers the value which is estimated by the mathematical model at the moment the tested sample was collected, such information being available only from the historical data base.

To correct the output of the mathematical model, a variation of the preferred embodiment comprises the use of another factor, hereinafter called "bias". Said factor is different from the ratio factor in that it should be added to the output value of the mathematical model. The bias is calculated as the difference between the value supplied by the test and the value estimated by the mathematical model at the moment when the tested sample was effectively collected. The bias should also be filtered before its addition to the output of the mathematical model.

Once the values of the variables which make up the control matrix have been determined with the aid of instruments which are directly connected to the plant equipment, through lab tests or through calculations effected on the values of other measured variables, a problem of the non-linear optimization for determining the values that the MVs should take under a stationary regimen (set points of the MVs) is solved.

The solution of the optimization problem determines still the sequence of adjustments, which are to be effected throughout a pre-determined period of time, so that the MVs attain the desired calculated values when considering the dynamics and the importance of each one of the CVs, the variation rate and the admissible limits for each of the MVs so that the CVs are kept close to the desired values, without violating the constraints (CCVs and variation rate). PID controllers receive the set points from the MVs calculated by the predictive controller and are in charge of keeping such variables close to these values.

The maximization of the production rate may be effected by choosing an arbitrarily high set point for the production rate. Said CV is limited by the heat exchange capacity of the system, where the control is effected by the opening of the temperature adjustment valve, which serves as a constraint to the control system. The control system will increase the flow rate of catalyst until the opening of the temperature control valve reaches a safe limit for the operation of the unit. Were this constraint not followed, the flow rate of catalyst could increase excessively causing that the temperature control valve stayed completely open, with the consequence that the temperature would be out of control and the unit would have to be shut down.

In spite of the fact that HDPE and LLDPE may be produced in the same unit, the production of each of these polymers has its own peculiarities. They are prepared in the presence of different catalysts, the HDPE being generally but not exclusively produced with a chromium catalyst while the LLDPE is generally but not exclusively produced with a Ziegler-Natta catalyst. Besides the catalyst type, the production of these polymers differs regarding to the operating conditions and also in regard to the procedures used in the operation of the plant. Due to such differences, this application describes and claims two embodiments or modes of the process for the controlled production of polyethylene, each of said modes using a specific control matrix according to the catalyst type used (chromium or Ziegler-Natta).

The process variables and the physical properties of the polyethylene, which may be controlled with the aid of the inventive process are:

The $MFR_1$ of the resin;

The density of the resin;

The MFRR of the resin (for the chromium catalyst);

The production rate;

The catalyst productivity;

The opening of the temperature control valve;

The ethylene partial pressure;

The superficial velocity of the gas in the fluidized bed;

The ratio between the concentrations of hydrogen and ethylene;

The ratio(s) between the concentrations of monomer(s) and ethylene;

The bubble point of the recycle stream (for the Ziegler-Natta catalyst).

Thus, in one mode of the invention, the process for the controlled production of polyethylene in gas phase reactor(s), isolated or combined with each other, under polymerization conditions, in the presence of hydrogen, oxygen, inert diluents and a chromium catalyst should comprise:

a) in the laboratory, periodically testing the MFR$_1$, MFRR and the density of the resin;

b) establishing the desired values or limits for the set of CVs and CCVs which encompasses production rate, MFR$_1$, MFRR and the density of the resin, catalyst productivity, opening of the temperature control valve, monomer partial pressure and superficial velocity of the gas in the reactor;

c) determining, in real time, the value of the variables cited in item b), the properties of the resin having their value continuously inferred with the aid of mathematical models;

d) establishing limits for the set of MVs which encompasses flow rate of catalyst, ratio between the concentrations of one or more comonomers and ethylene, ratio between the flow rates of one or more comonomers and ethylene, temperature of the fluidized bed, ratio between the flow rates of oxygen and ethylene, ratio between the flow rates of hydrogen and ethylene, flow rate of the recycle stream, flow rate of inert diluent(s) and opening of the purge valve;

e) establishing limits for the variation rate of the variables of item d);

f) using mathematical models of the process, simultaneously calculating the values which should be assumed by the variables cited in item d) under a stationary regimen, considering that the level of the fluidized bed as well as the reactor pressure will be kept at constant values, so that the desired values set forth in b) will be reached without violating the limits established in items b) and d);

g) determining the sequence of adjustments, to be effected during a pre determined period of time, so that the variables cited in d) reach the desired values calculated in item f) considering the dynamics and the importance of each of the variables cited in b) as well as the constraints established in e);

h) adjusting the flow rates of catalyst, comonomer(s), cooling water, oxygen, hydrogen, inert diluent(s), the flow rate of the recycle stream and the opening of the purge valve so as to satisfy the previous items; and i) based on the lab tests, periodically correcting the value which is inferred for the properties of the resin.

Presented below, the input variables for each of the models comprised for the production of polyethylene based on the chromium catalyst according to the present invention. The relationships described below are summarized in FIG. 6. The names of the process variables which are shown in said Figure are described in TABLE 1.

The preferred comonomer, the flow rate of which is used as MV, is 1-butene, but optionally other comonomers may be used as well.

Melt Flow Rate (MFR$_1$)

This property is a controlled variable, generally related to the molecular weight and to the polymer composition. In the state-of-the-art technique such property is assessed through periodical collections, this causing a time gap between the instant of the measurement and what actually occurs in the plant.

In case the MFR$_1$ model of the resin is designed to the inference or to the control of said property, the relevant parameters are:

temperature of the fluidized bed;

ratio between the flow rates of oxygen and ethylene;

ratio between the hydrogen and ethylene concentrations;

ratio between the comonomer(s) and ethylene concentrations.

Ratio of Melt Flow Rates (MFRR)

In case the MFRR model of the resin is designed to the inference or to the control of said property, the relevant parameters are:

temperature of the fluidized bed;

ratio between the flow rates of oxygen and ethylene;

ratio between the hydrogen and ethylene concentrations;

ratio between the comonomer(s) and ethylene concentrations.

Density

In case the model of density of the resin is designed to the inference or to the control of said property, the relevant parameters are:

temperature of the fluidized bed;

ratio between the flow rates of oxygen and ethylene;

ratio between the comonomer(s) and ethylene concentrations.

Production Rate, Opening of the Temperature Control Valve and Catalyst Productivity These variables are of utmost importance for the process economics. The lower variance of said variables resulting from a more advanced control method such as that described and claimed in the present invention causes that the average values of said variables are higher than those obtained from the conventional control systems, taking into consideration the heat transfer limits of the reactors, which are represented by the opening of the temperature control valve.

The opening of the temperature control valve is one of the constraints which should be taken into consideration in order not to miss the reaction control, since if said valve is completely open there is no possibility to increase the flow rate of the cooling water to the heat exchanger and the temperature goes off, this causing that the unit should be shut down.

The control models for the production rate, opening of the temperature control valve and catalyst productivity use the following input variables to predict the future behavior of the said variables:

flow rate of catalyst;

ratio between the flow rates of comonomer(s) and ethylene;

temperature of the fluidized bed;

ratio between the flow rates of hydrogen and ethylene;

flow rate of inert diluent(s);

opening of the purge valve;

level of the fluidized bed.

Ethylene Partial Pressure

The control models for ethylene partial pressure use the following input variables to predict the future behavior of the said variable:

ratio between the flow rates of comonomer(s) and ethylene;

temperature of the fluidized bed;

ratio between the flow rates of oxygen and ethylene;

ratio between the flow rates of hydrogen and ethylene;

reactor pressure;

opening of the purge valve;

level of the fluidized bed.

Ratio Between the Flow Rates of Hydrogen and Ethylene in the Reactor

The control model for the ratio between the concentrations of hydrogen and ethylene in the reactor uses the following input variables to predict the future behavior of the said variable:
- ratio between the flow rates of comonomer(s) and ethylene;
- ratio between the flow rates of oxygen and ethylene;
- ratio between the flow rates of hydrogen and ethylene;
- flow rate of inert diluent(s);
- opening of the purge valve.

Ratio Between the Concentrations of Comonomer(s) and Ethylene in the Reactor

The control model(s) for the ratio between the concentrations of comonomer(s) and ethylene in the reactor use the following input variables to predict the future behavior of the said variable(s):
- ratio between the flow rates of comonomer(s) and ethylene;
- temperature of the fluidized bed;
- ratio between the flow rates of oxygen and ethylene;
- ratio between the flow rates of hydrogen and ethylene;
- flow rate of inert diluent(s);
- opening of the purge valve.

Superficial Velocity

The control model for the superficial velocity in the reactor uses the following input variable to predict the future behavior of the said variable:
- ratio between the flow rates of comonomer(s) and ethylene;
- temperature of the fluidized bed;
- ratio between the flow rates of oxygen and ethylene,
- ratio between the flow rates of hydrogen and ethylene;
- flow rate of the recycle stream;
- flow rate of inert diluent(s);
- opening of the purge valve.

And according to another preferred mode of the invention, the process for the controlled production of polyethylene and its copolymers in gas phase reactor(s), isolated or combined with each other, under polymerization conditions, in the presence of hydrogen, oxygen, inert diluents and a Ziegler-Natta catalyst should comprise:

(a) In the laboratory, periodically testing the $MFR_2$ and density of the resin, (b) Establishing desired values or limits for the set of CVs and CCVs which comprise production rate, the resin $MFR_2$ and density, catalyst productivity, opening of the temperature control valve, monomer partial pressure, superficial velocity of the gas in the reactor, bubble point of the recycle stream and difference between the inlet and exit temperature of the water in the cooling system of the reactor;

(c) Determining in real time the value of the variables of item (b), the resin properties having their value continuously inferred with the aid of mathematical models;

(d) Establishing limits for the set of MVs which comprises flow rate of catalyst, ratio between the concentrations of one or more comonomers and ethylene, ratio between the flow rates of one or more comonomers and ethylene, temperature of the fluidized bed, ratio between the flow rates of oxygen and ethylene, ratio between the concentrations of hydrogen and ethylene, ratio between the flow rates of hydrogen and ethylene, flow rate of the recycle stream, flow rate of inert diluent(s) and opening of the purge valve; reactor pressure, level of the fluidized bed, density of the gas in the recycle stream and superficial velocity;

(e) Establishing limits for the variation rate of the variables cited in item (d);

(f) By using mathematical models of the process, simultaneously calculating the values that the variables cited in item (d) should take in a stationary condition, considering that the level of the fluidized bed and the reactor pressure will remain constant, so that the desired values established in (b) will be reached without violating the limits established in items (b) and (d);

(g) Determining the sequence of adjustments to be made along a predetermined period of time, so that the variables cited in item (s) reach the desired values calculated in item (f) considering the dynamics and the relevance of each of the variables cited in (b) and the constraints established in (e);

(h) Adjusting the flow rates of catalyst, comonomer(s), cooling water, oxygen, hydrogen, inert diluent(s), the flow rate of the recycle stream and the opening of the purge valve so as to satisfy the previous items;

(i) based on the laboratory tests, periodically correcting the value inferred for the resin properties The input variables for each of the models comprised by the process for producing polyethylene using a Ziegler-Natta catalyst according to the present invention are presented below. The relationships described hereinafter are summarized in FIG. 7. The name of the process variables which appear in such Figure are described in Table 1.

The comonomer(s) preferably used, the flow rates of which are used as MV are 1-butene and optionally 1-hexene, but other comonomers may be used as well, according to the resin to be produced.

Melt Flow Rate 2 ($MFR_2$)

In case that the $MFR_2$ model of the resin is designed for the inference or for the control of said property, the relevant parameters are:
- Temperature of the fluidized bed;
- Ratio between the concentrations of hydrogen and ethylene;
- Ratio between the concentration(s) of comonomer(s) and ethylene.

Density

In case the model of the density of the resin is designed for the inference or for the control of said property, the relevant parameters are:
- Temperature of the fluidized bed;
- Ratio between the concentrations of hydrogen and ethylene;
- Ratio between the concentration(s) of comonomer(s) and ethylene.

Production Rate, Opening of the Temperature Control Valve, Difference Between the Inlet and Exit Temperatures of the Water in the Cooling System of the Reactor and Ethylene Partial Pressure Besides the opening of the valve there is another factor which should be considered when the process stability is sought, this being the difference between the inlet and exit temperatures of the water in the reactor cooling system. The water exits the heat exchanger at a temperature higher than the inlet temperature and is directed to a cooling tower so that it may return to the heat exchanger and take back the reaction heat from the system. Said cooling tower may receive hot water from various heat exchangers. If the water gets to the cooling tower at a very high temperature the tower does not succeed in cooling the water as required and said water returns to the heat exchange system of the reactor at a temperature which is still too high. If the temperature of the water which is directed to the heat exchanger is too close to the temperature at which the water exits the heat exchanger, the temperature gets out of control since the water which reaches the heat exchanger loses the capacity of withdrawing heat. Generally in this case the temperature control valve eventually is completely open in trying to withdraw more heat, however this is useless since there is no point in opening the temperature valve if the water which enters the heat exchanger is still too hot.

The control models for production rate, opening of the temperature control valve, difference between the inlet and outlet temperatures of the water in the cooling system of the reactor and ethylene partial pressure use the following input variables to predict the future behavior of said variables:

Flow rate of catalyst;

Temperature of the fluidized bed;

Ratio between the flow rates of comonomer(s) and ethylene;

Ratio between the flow rates of hydrogen and ethylene;

Flow rate of inert diluent(s);

Reactor Pressure

Opening of the purge valve;

Level of the fluidized bed.

Catalyst Productivity

The control models for the catalyst productivity use the following input variables to predict the future behavior of said variable:

Temperature of the fluidized bed.

Ratio between the flow rates of comonomer(s) and ethylene;

Ethylene partial pressure.

Ratio Between the Concentrations of Hydrogen and Ethylene in the Reactor

The control model for the ratio between the concentrations of hydrogen and ethylene in the reactor uses the following input variables to predict the future behavior of said variable:

Ratio between the flow rates of comonomer(s) and ethylene;

Ratio between the flow rates of hydrogen and ethylene;

Flow rate of inert diluent(s);

Opening of the purge valve;

Flow rate of catalyst;

Temperature of the fluidized bed;

Ethylene partial pressure;

Level of the fluidized bed.

Ratio Between the Concentration(s) of Comonomer(s) and Ethylene in the Reactor

The control model for the ratio between the concentrations of comonomer(s) and ethylene in the reactor uses the following input variables to predict the future behavior of said variable:

Ratio between the flow rates of comonomer(s) and ethylene;

Ratio between the flow rates of hydrogen and ethylene;

Flow rate of inert diluent(s);

Opening of the purge valve;

Flow rate of catalyst;

Ethylene partial pressure;

Level of the fluidized bed.

Bubble Point of the Recycle Stream

The control model for the bubble point of the recycle stream in the reactor uses the following input variable to predict the future behavior of said variable:

Ratio between the flow rates of comonomer(s) and ethylene.

Superficial Velocity

The control model for the superficial velocity in the reactor uses the following input variables to predict the future behavior of said variable:

Flow rate of the recycle stream;

Density of the gas in the recycle stream.

Having improved the control of the production rate in the reactor a reduction in the standard deviation of said variable was observed. As a consequence of the better stability, the average production rate of the unit was increased, as demonstrated in the Example below.

Figure 6:
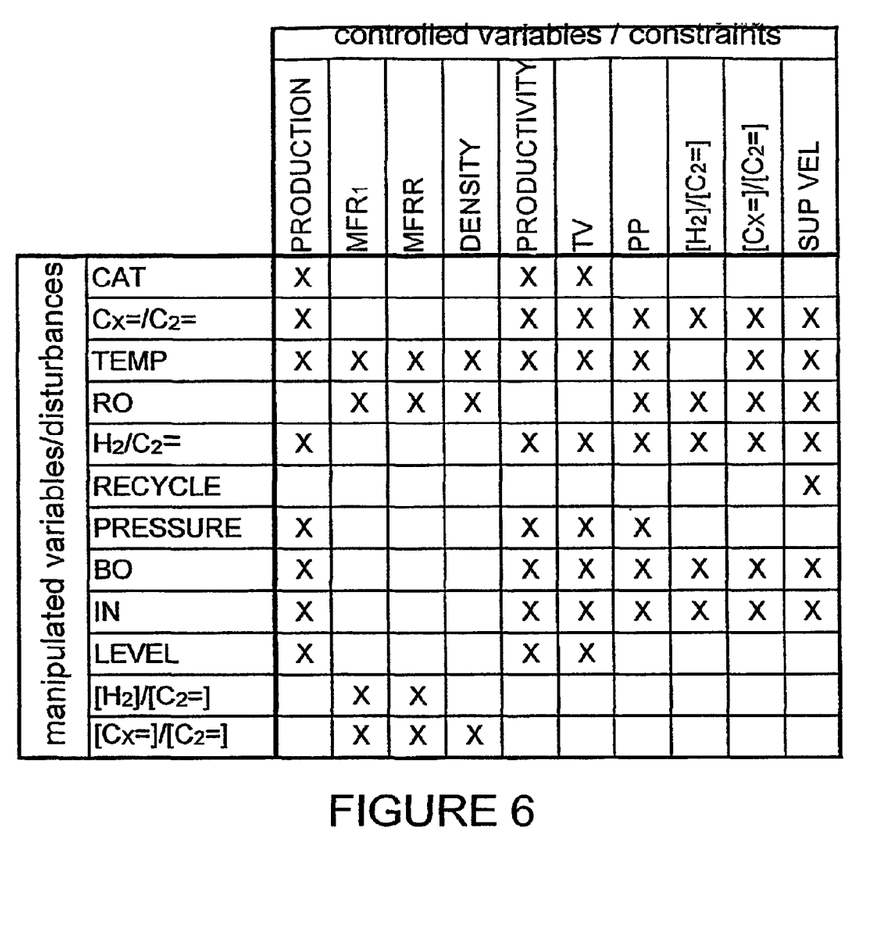
FIG. 6 is a representation of the control matrix characteristic of the embodiment of the invention for the controlled production of polyethylene and its copolymers using a chromium catalyst.
Figure 7:
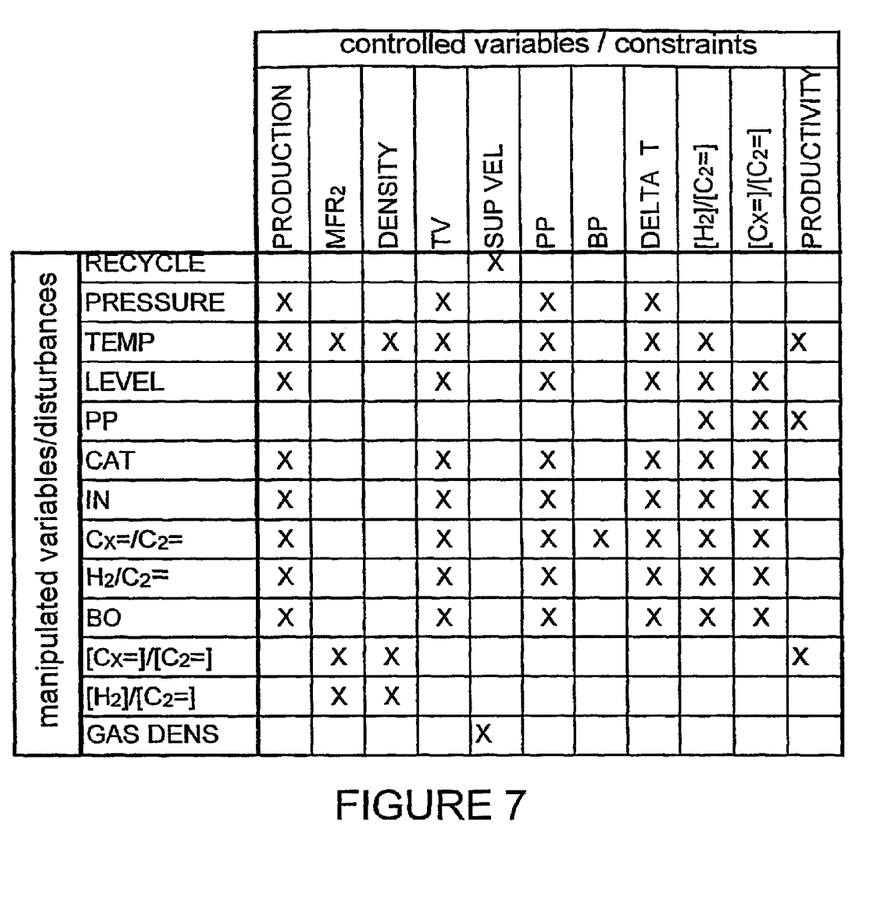
FIG. 7 is a representation of the control matrix characteristic of the embodiment of the invention for the controlled production of polyethylene and its copolymers using a Ziegler-Natta catalyst.

TABLE 1 below lists the variables involved in the control matrices represented in FIG. 6 and FIG. 7.

TABLE 1

| VARIABLE | DESCRIPTION |
| --- | --- |
| PRODUCTION | Production rate |
| $MFR_1$ | Melt Flow Rate 1 of the polymer |
| $MFR_2$ | Melt Flow Rate 2 of the polymer |
| MFRR | Ratio of Melt Flow Rates of the polymer |
| Density | Density of the polymer |
| PRODUCTIVITY | Catalyst Productivity (ton PE/kg cat) |
| TV | Opening of the temperature control valve |
| PP | Monomer Partial Pressure |
| SUP VEL | Superficial Velocity |
| CAT | Flow rate of catalyst |
| DELTA T | Difference between the inlet and exit temperature of the water in the rector cooling system |
| $C_x=/C_2=$ | Ratio between the flow rates of comonomer(s) and ethylene |
| TEMP | Temperature of the fluidized bed |
| RO | Ratio between the flow rates of oxygen and ethylene |
| $H_2/C_2=$ | Ratio between the flow rates of hydrogen and ethylene |
| RECYCLE | Flow rate of the recycle stream |
| IN | Flow rate of inert diluent (s) |
| PRESSURE | Reactor pressure |
| BO | Opening of the purge valve |
| LEVEL | Level of the fluidized bed |
| $[H_2]/[C_2=]$ | Ratio between the concentrations of hydrogen and ethylene |
| $[C_x=]/[C_2=]$ | Ratio between the concentrations of comonomer(s) and ethylene |
| BP | Bubble point of the recycle stream |
| GAS DENS | Density of gas in the recycle stream |

EXAMPLE

Figure 8:
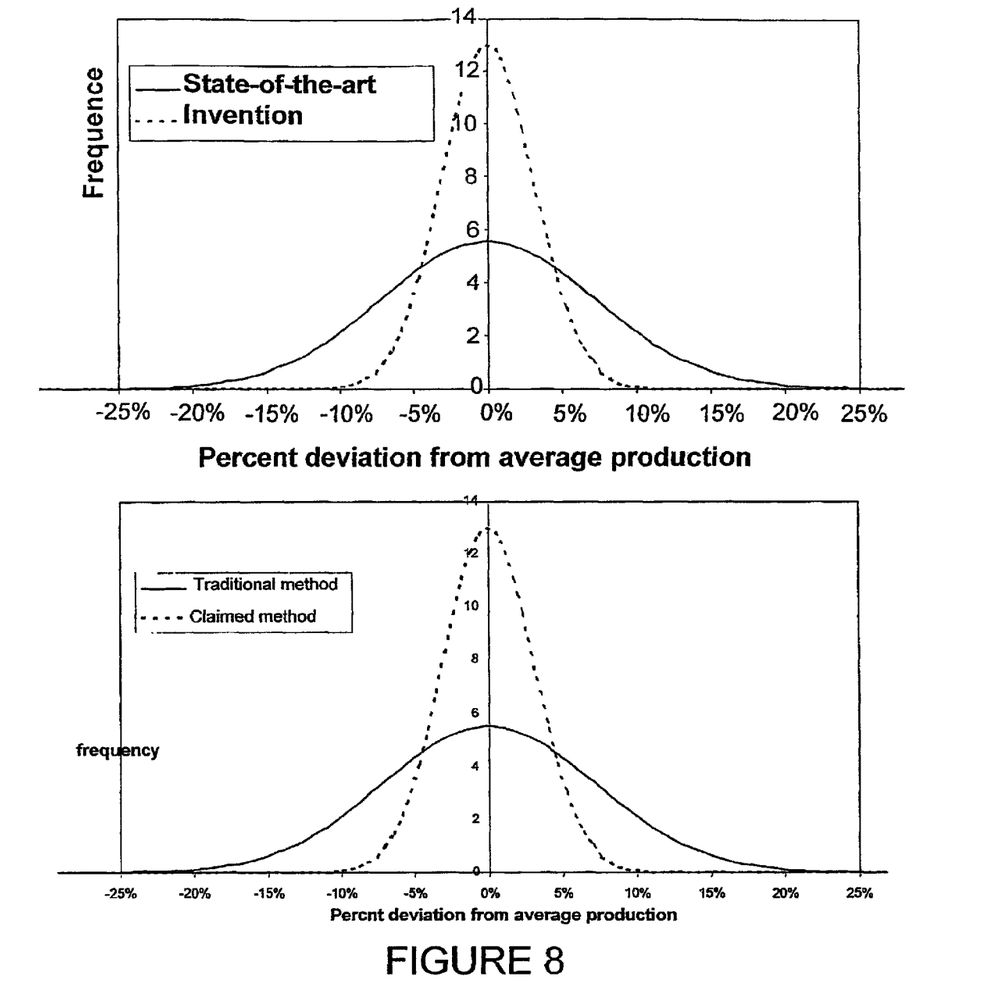
FIG. 8 is a graph showing the frequency and intensity of the deviations between the production rate and its average value. The reduction in the variation of the production rate caused by the use of the process described and claimed in the present invention may be observed.

One of the main benefits consequent to the use of the advanced control method as described in the present invention refers to the lower variability in the product quality and in process variables such as production rate. The standard deviation of the production rate for the reactor under study was reduced from 0.62 ton/h to 0.27 ton/h, this meaning a 56% reduction. This is illustrated in FIG. 8.

The higher shift between the production rate and its average, which in the conventional process is around 22%, was reduced to around 10%. This result was obtained by comparing the production rate of the unit during 7 days continuous operation with and without the control method of the invention.

Besides the reduction in the variability of the production rate under normal conditions, it may be seen that if an out-of-control situation for the reactor temperature occurs, the normal production rate is quicker and more efficiently recovered.

The sum of these factors make possible that the average of the production rate be shifted to higher values. For the reactor under study the increase in said variable reached 19.2%.

What is claimed is:

1. A process for the controlled production of polyethylene and its copolymers in gas phase fluidized reactor(s), isolated or combined, under polymerization conditions, in the presence of hydrogen, oxygen, inert diluent(s) and chromium catalyst, wherein said process comprises the steps of:
   a) In the laboratory, periodically testing the $MFR_1$, MFRR and the density of a resin;
   b) establishing the desired values or limits for the set of CVs and CCVs which comprises production rate, $MFR_1$, MFRR and the density of the resin, catalyst productivity, opening of a temperature control valve, monomer partial pressure and superficial velocity of the gas in the reactor;
   c) determining, in real time, the value of the variables cited in item b), the properties of the resin having their value continuously inferred with the aid of mathematical models
   d) establishing limits for the set of MVs which comprises flow rate of catalyst, ratio between the concentrations of one or more comonomers and ethylene, ratio between the flow rates of one or more comonomers and ethylene, temperature of the fluidized bed, ratio between the flow rates of oxygen and ethylene, ratio between the flow rates of hydrogen and ethylene, flow rate of a recycle stream, flow rate of inert diluent(s) and opening of a purge valve;
   e) establishing limits for the variation rate of the variables of item d);
   f) using process mathematical models, simultaneously calculating the values which should be assumed under a stationary regimen by the variables cited in item d), considering that the level of the fluidized bed as well as the reactor pressure will be kept at constant values, so that the desired values set forth in b) will be reached without violating the limits established in items b) and d);
   g) determining the sequence of adjustments, to be effected during a pre determined period of time, so that the variables cited in d) reach the desired values calculated in item f) considering the dynamics and the importance of each of the variables cited in b) as well as the constraints established in e);
   h) adjusting the flow rates of catalyst, comonomer(s), cooling water, oxygen, hydrogen, inert diluent(s), the flow rate of the recycle stream and the opening of the purge valve so as to satisfy the previous items; and
   i) based on the lab tests, periodically correcting the value which is inferred for the properties of the resin.

2. A process according to claim 1, wherein the gas phase reactors are vertical or horizontal fluidized bed or vertical or horizontal stirred-bed reactors.

3. A process according to claim 1, wherein the mathematical models are empirical, rigorous or a combination of empirical and rigorous models.

4. A process according to claim 1, wherein the mathematical models are neural networks.

5. A process according to claim 1, wherein ethylene is polymerized alone or combined with one or more olefin comonomers.

6. A process according to claim 5, wherein the olefin comonomers are propene; 1-butene; 2-methyl propene; 1-pentene; 1-hexene; 1-octene; 1-decene; 3-methyl 1-butene; 4-methyl 1-pentene; cyclopentene.

7. A process according to claim 1, wherein the inert diluent(s) are nitrogen; argon and alkanes having up to 6 carbon atoms, isolated or in admixture with each other in any amount.

8. A process according to claim 1, wherein the physical property of the resin that is controlled is the melt flow rate.

9. A process according to claim 8, wherein the model for the control of the melt flow rate of the resin uses the following input variables:

Temperature of the fluidized bed;

Ratio between the flow rates of oxygen and ethylene;

Ratio between the hydrogen and ethylene concentrations;

Ratio between the comonomer(s) and ethylene concentrations.

10. A process according to claim 1, wherein the physical property of the resin that is controlled is the ratio of melt flow rates.

11. A process according to claim 10, wherein the model for the control of the ratio of the melt flow rates of the resin uses the following input variables:

Temperature of the fluidized bed;

Ratio between the flow rates of oxygen and ethylene;

Ratio between the hydrogen and ethylene concentrations;

Ratio between the comonomer(s) and ethylene concentrations.

12. A process according to claim 1, wherein the physical property of the resin that is controlled is the density.

13. A process according to claim 12, wherein the model for the control of the density of the resin uses the following input variables:

Temperature of the fluidized bed;

Ratio between the flow rates of oxygen and ethylene;

Ratio between the comonomer(s) and ethylene concentrations.

14. A process according to claim 1, wherein the variable that is controlled is the production rate.

15. A process according to claim 14, wherein the model for the control of the production rate uses the following input variables:

Flow rate of catalyst;

Ratio between the flow rates of comonomer(s) and ethylene;

Temperature of the fluidized bed;

Ratio between the flow rates of hydrogen and ethylene;

Flow rate of inert diluent(s);

Reactor pressure;

Opening of the purge valve;

Level of the fluidized bed.

16. A process according to claim 1, wherein the variable that is controlled is the opening of the temperature control valve.

17. A process according to claim 16, wherein the model for the control of the opening of the temperature control valve uses the following input variables:

Flow rate of catalyst;

Ratio between the flow rates of comonomer(s) and ethylene;

Temperature of the fluidized bed;

Ratio between the flow rates of hydrogen and ethylene;

Flow rate of inert diluent(s);
Reactor pressure;
Opening of the purge valve;
Level of the fluidized bed.

18. A process according to claim 1, wherein the variable that is controlled is the catalyst productivity.

19. A process according to claim 18, wherein the model for the control of the catalyst productivity uses the following input variables:
   Flow rate of catalyst;
   Ratio between the flow rates of comonomer(s) and ethylene;
   Temperature of the fluidized bed;
   Ratio between the flow rates of hydrogen and ethylene;
   Flow rate of inert diluent(s);
   Reactor pressure;
   Opening of the purge valve;
   Level of the fluidized bed.

20. A process according to claim 1, wherein the variable that is controlled is the partial pressure of ethylene in the reactor.

21. A process according to claim 20, wherein the model for the control of the partial pressure of ethylene in the reactor uses the following input variables:
   Ratio between the flow rates of comonomer(s) and ethylene;
   Temperature of the fluidized bed;
   Ratio between the flow rates of oxygen and ethylene
   Ratio between the flow rates of hydrogen and ethylene;
   Flow rate of inert diluent(s);
   Reactor pressure;
   Opening of the purge valve;
   Level of the fluidized bed.

22. A process according to claim 1, wherein the variable that is controlled is the ratio between the concentrations of hydrogen and ethylene in the reactor.

23. A process according to claim 22, wherein the model for the control of the ratio between the concentrations of hydrogen and ethylene in the reactor uses the following input variables:
   Ratio between the flow rates of comonomer(s) and ethylene;
   Ratio between the flow rates of oxygen and ethylene;
   Ratio between the flow rates of hydrogen and ethylene;
   Flow rate of inert diluent(s);
   Opening of the purge valve.

24. A process according to claim 1, wherein the variable that is controlled is the ratio between the concentrations of comonomer(s) and ethylene in the reactor.

25. A process according to claim 24, wherein the model for the control of the ratio between the concentrations of comonomer(s) and ethylene in the reactor uses the following input variables:
   Ratio between the flow rates of comonomer(s) and ethylene;
   Temperature of the fluidized bed;
   Ratio between the flow rates of oxygen and ethylene
   Ratio between the flow rates of hydrogen and ethylene;
   Flow rate of inert diluent(s);
   Opening of the purge valve.

26. A process according to claim 1, wherein the variable that is controlled is the superficial velocity of the gas in the fluidized bed.

27. A process according to claim 26, wherein the model for the control of the superficial velocity of the gas in the gas phase reactor uses the following input variables:
   Ratio between the flow rates of comonomer(s) and ethylene;
   Temperature of the fluidized bed;
   Ratio between the flow rates of oxygen and ethylene
   Ratio between the flow rates of hydrogen and ethylene;
   Flow rate of the recycle stream;
   Flow rate of inert diluent(s);
   Opening of the purge valve.

28. A process for the controlled production of polyethylene and its copolymers in gas phase fluidized bed reactor(s), isolated or combined, under polymerization conditions, in the presence of hydrogen, oxygen, inert diluents and a Ziegler-Natta catalyst, wherein said process comprises the steps of:
   a) In the laboratory, periodically testing the $MFR_2$ and density of a resin;
   b) Establishing desired values or limits for the set of CVs and CCVs which comprise production rate, the resin $MFR_2$ and density, catalyst productivity, opening of a temperature control valve, monomer partial pressure, superficial velocity of the gas in the reactor, bubble point of a recycle stream and difference between the inlet and outlet temperature of the water in a cooling system of the reactor;
   c) Determining in real time the value of the variables of item (b), the resin properties having their value continuously inferred with the aid of mathematical models;
   d) Establishing limits for the set of MVs which comprises flow rate of catalyst, ratio between the concentrations of one or more comonomers and ethylene, ratio between the flow rates of one or more comonomers and ethylene, temperature of the fluidized bed, ratio between the flow rates of oxygen and ethylene, ratio between the concentrations of hydrogen and ethylene, ratio between the flow rates of hydrogen and ethylene, flow rate of a recycle stream, flow rate of inert diluent(s) and opening of a purge valve; reactor pressure, level of the fluidized bed, density of the gas in a recycle stream and superficial velocity;
   e) Establishing limits for the variation rate of the variables cited in item (d);
   f) By using mathematical models of the process, simultaneously calculating the values which should be taken in a stationary condition by the variables cited in item (d), considering that the level of a fluidized bed and the reactor pressure will remain constant, so that the desired values established in (b) will be reached without violating the limits established in items (b) and (d);
   g) Determining the sequence of adjustments to be made along a predetermined period of time, so that the variables cited in item (d) reach the desired values calculated in item (f) considering the dynamics and the relevance of each of the variables cited in (b) and the constraints established in (e);
   h) Adjusting the flow rates of catalyst, comonomer(s), cooling water, oxygen, hydrogen, inert diluent(s), the flow rate of the recycle stream and the opening of the purge valve so as to satisfy the previous items;
   i) based on the laboratory tests, periodically correcting the value inferred for the resin properties.

29. A process according to claim 28, wherein the gas phase reactors are vertical or horizontal fluidized bed reactors or vertical or horizontal stirred-bed reactors.

30. A process according to claim 28, wherein the mathematical models are empirical, rigorous or a combination of empirical and rigorous models.

31. A process according to claim 28, wherein the mathematical models are neural networks.

32. A process according to claim 28, wherein the ethylene is polymerized alone or combined with one or more olefin monomers.

33. A process according to claim 32, wherein the olefin comonomers are propene; 1-butene; 2-methyl propene; 1-pentene; 1-hexene; 1-heptene; 1-octene; 1-decene; 3-methyl 1-butene; 4-methyl 1-pentene; cyclopentene.

34. A process according to claim 28, wherein the inert diluents are nitrogen; argon and alkanes having up to 6 carbon atoms, isolated or admixed with each other in any amount.

35. A process according to claim 28, wherein the variable that is controlled is the production rate.

36. A process according to claim 35, wherein the model for the control of the production rate uses the following input variables:
    Flow rate of catalyst;
    Ratio between the flow rates of comonomer(s) and ethylene;
    Temperature of the fluidized bed;
    Ratio between the flow rates of hydrogen and ethylene;
    Flow rate of inert diluent(s);
    Reactor pressure;
    Opening of the purge valve;
    Level of the fluidized bed.

37. A process according to claim 28, wherein the physical property of the resin that is controlled is the melt flow rate.

38. A process according to claim 37, wherein the model for the control of the melt flow rate uses the following input variables:
    Temperature of the fluidized bed;
    Ratio between the concentrations of hydrogen and ethylene;
    Ratio between the concentration(s) of comonomer(s) and ethylene.

39. A process according to claim 28, wherein the physical property of the resin that is controlled is the density.

40. A process according to claim 39, wherein the model for the control of the density of the resin uses the following input variables:
    Temperature of the fluidized bed;
    Ratio between the concentrations of hydrogen and ethylene;
    Ratio between the concentration(s) of comonomer(s) and ethylene.

41. A process according to claim 28, wherein the variable that is controlled is the opening of the temperature control valve.

42. A process according to claim 41, wherein the model for the control of the opening of the temperature control valve uses the following input variables:
    Flow rate of catalyst;
    Ratio between the flow rates of comonomer(s) and ethylene;
    Temperature of the fluidized bed;
    Ratio between the flow rates of hydrogen and ethylene;
    Flow rate of inert diluent(s);
    Reactor pressure;
    Opening of the purge valve;
    Level of the fluidized bed.

43. A process according to claim 28, wherein the variable that is controlled is the superficial velocity of the gas in the fluidized bed.

44. A process according to claim 43, wherein the model for the control of the superficial velocity of the gas in the fluidized bed uses the following input variables:
    Flow rate of the recycle stream;
    Density of the gas in the recycle stream.

45. A process according to claim 28, wherein the variables that is controlled is the partial pressure of ethylene in the reactor.

46. A process according to claim 45, wherein the model for the control of the partial pressure of ethylene in the reactor uses the following input variables:
    Flow rate of catalyst;
    Temperature of the fluidized bed;
    Ratio between the flow rates of comonomer(s) and ethylene;
    Ratio between the flow rates of hydrogen and ethylene;
    Flow rate of inert diluent(s);
    Reactor Pressure;
    Opening of the purge valve;
    Level of the fluidized bed.

47. A process according to claim 28, wherein the variable that is controlled is the bubble point of the recycle stream.

48. A process according to claim 47, wherein the model for the control of the bubble point of the recycle stream uses the following input variable:
    Ratio between the flow rates of comonomer(s) and ethylene.

49. A process according to claim 28, wherein the variable that is controlled is the difference between the inlet and outlet temperatures of the water in the cooling system of the reactor.

50. A process according to claim 49, wherein the model for the control of the difference between the inlet and outlet temperatures of the water in the cooling system of the reactor uses the following input variables:
    Flow rate of catalyst:
    Temperature of the fluidized bed;
    Ratio between the flow rates of comonomer(s) and ethylene;
    Ratio between the flow rates of hydrogen and ethylene;
    Flow rate of inert diluent(s);
    Reactor Pressure
    Opening of the purge valve;
    Level of the fluidized bed.

51. A process according to claim 28, wherein the variable that is controlled is the ratio between the concentrations of hydrogen and ethylene in the reactor.

52. A process according to claim 51, wherein the model for the control of the ratio between the concentrations of hydrogen and ethylene in the reactor uses the following input variables:
    Ratio between the flow rates of comonomer(s) and ethylene;
    Ratio between the flow rates of hydrogen and ethylene;

Flow rate of inert diluent(s);
Opening of the purge valve;
Flow rate of catalyst;
Temperature of the fluidized bed;
Ethylene partial pressure;
Level of the fluidized bed.

53. A process according to claim 28, wherein the variable that is controlled is the ratio between the concentrations of comonomer(s) and ethylene in the reactor.

54. A process according to claim 53, wherein the model for the control of the ratio between the concentrations of comonomer(s) and ethylene in the reactor uses the following input variables:

Ratio between the flow rates of comonomer(s) and ethylene;
Ratio between the flow rates of hydrogen and ethylene;
Flow rate of inert diluent(s);
Opening of the purge valve;
Flow rate of catalyst;
Ethylene partial pressure:
Level of the fluidized bed.

55. A process according to claim 28, wherein the variable that is controlled is the catalyst productivity.

56. A process according to claim 55, wherein the model for the control of the catalyst productivity uses the following input variables:

Flow rate of catalyst;
Temperature of the fluidized bed;
Ratio between the flow rates of comonomer(s) and ethylene;
Ratio between the flow rates of hydrogen and ethylene;
Flow rate of inert diluent(s);
Reactor pressure;
Opening of the purge valve;
Level of the fluidized bed.

* * * * *